Patented Jan. 9, 1951

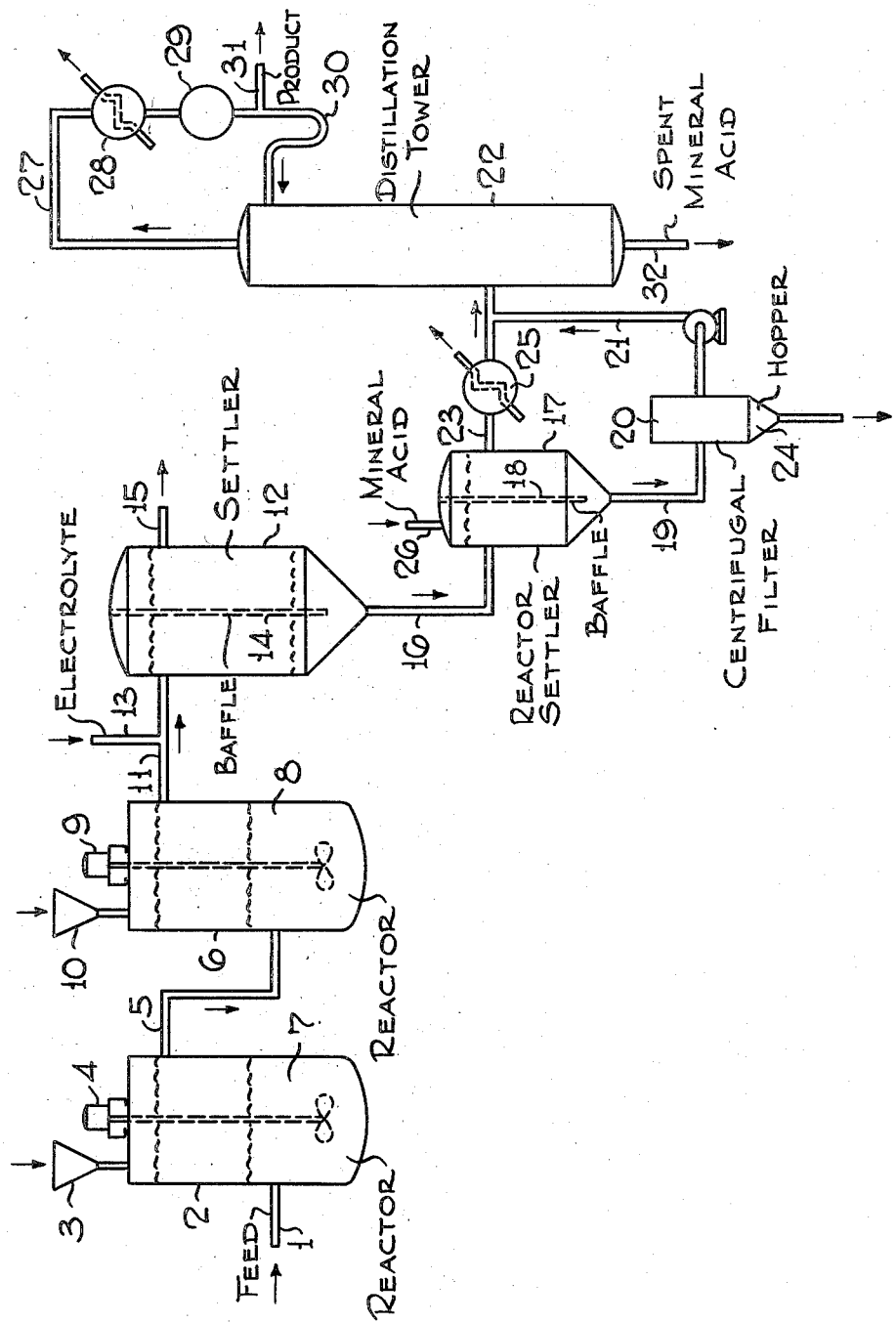

2,537,133

UNITED STATES PATENT OFFICE 2,537,133

RECOVERY OF ORGANIC ACIDS FROM DILUTE AQUEOUS SOLUTION

Chauncey C. Hale, Cranford, N. J., assignor to Standard Oil Development Company, a corporation of Delaware Application December 18, 1948, Serial No. 66,107

4 Claims. (Cl. 260—450)

This invention relates to an improved process for recovering fatty acids present in low concentrations in aqueous solutions. More particularly, it relates to an efficient commercially feasible process for the recovery of a mixture of fatty acids as found in low concentrations in the aqueous layer resulting from hydrocarbon synthesis reactions.

Hydrocarbon synthesis reactions are performed by contacting hydrogen and oxides of carbon with catalysts under various temperature and pressure conditions. The temperatures employed vary widely, as for example, in the range from about 200° C. to about 425° C. and are generally in the range from 260° C. to about 370° C. The particular temperature employed depends upon, among other factors, the type of non-gaseous hydrocarbon product desired, the character and the activity of the particular catalyst utilized, the throughput and composition of the synthetic gases and upon the reaction pressure. The pressures, likewise, vary considerably and are a function of other operative conditions such as catalyst employed, activity of the catalyst, character of the feed gases and the temperatures utilized. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The proportion of the type products obtained also varies with the conditions. In all cases, however, gaseous products removed overhead from the reaction zone are condensed and segregated into an oil phase and an aqueous phase.

The oxygenated compounds produced during hydrocarbon synthesis are distributed between the oil and water phases in an amount which is a function of the relative volume of product oil and water, their molecular weight and type as well as their intermixed solvency effect. The latter factor is involved in the distribution of the oxygenated compounds in the two phases. In normal operations, the ratio of water produced to oil produced may vary over the range from about 0.8 to 3.0 volumes of water per volume of oil, depending upon the operating conditions and the catalyst employed during the synthesis. Accordingly, there is a wide variation in the proportion of the total oxygenated compounds existing in the water phase; and this extends over the approximate range from 10 to 40 weight percent.

The oxygenated compounds found in the water layer comprise the neutral compounds including alcohols, aldehydes, ketones and esters, and also fatty acids.

The neutral oxygenated compounds are recovered from the water layer by distillation carried on below 100° C. The neutral compounds and their water azeotropes are thus stripped off first, leaving substantially only the fatty acids in the water. The stripped aqueous layer or acid water bottoms from most synthesis runs contains the $C_2$–$C_{12}$ aliphatic acids in a total concentration equivalent to about 2 to 5 weight percent as acetic acid, often nearer the lower figure. It is desirable to recover these acids in marketable purities and substantially quantitatively from the water, since their disposal as waste is not practical due to the pollution problems and any chemical disposal involves added expense in the hydrocarbon synthesis process. In addition, these organic acids represent valuable chemical raw materials for industry.

Economic recovery of acids in such low concentrations is quite difficult to achieve by conventional distillation methods because of the prohibitive heat requirements and equipment sizes necessitated by the very dilute feeds. This applies of course to any very dilute aqueous solution of lower fatty acids as well as the dilute solutions obtained from hydrocarbon synthesis reactions discussed.

It has now been found that these acids can be recovered on a commercially feasible basis by chemical recovery method. The method of this invention comprises, in effect, reacting the dilute acid solutions with a bismuth compound, preferably an oxide of bismuth, or a mixture of bismuth compounds whereby in the case of acetic acid a basic bismuth acetate is precipitated which after ordinary drying has the formula BiOAc. The acids are then regenerated from the bismuth fatty acid salt precipitate and recovered in commercial strengths.

The fatty acids may be regenerated from the bismuth fatty acid salt precipitates by a number of processes such as, for example, by treating the precipitate with controlled amounts of steam, sulfuric acid, or $SO_3$. In the case of recovery by steam, bismuth oxide is obtained directly as a by-product and can be reused in the reaction. Where sulfuric acid or sulfur trioxide are used, bismuth sulfate is formed. The bismuth sulfate can be decomposed to give the bismuth oxide by roasting at an elevated temperature. A cyclic process is thereby created. The acids themselves can be converted to other useful products.

The general term, "mixture of fatty acids," is hereafter used to indicate a mixture of the acids listed above generally found in the water layer of the hydrocarbon synthesis reaction.

It is to be understood, of course, that while the process of this invention is applicable to the recovery of a mixture of fatty acids, it is also applicable where there is only one acid present in the aqueous solution. In the descriptions that follow wherever the term, "mixture of fatty acids" occurs, this term, therefore, can usually be replaced by one of the specific acids, i. e., acetic acid.

This invention will be further explained by reference to the accompanying flow diagram.

The aqueous feed containing a mixture of fatty acids is fed through line 1 to a lower portion of reactor 2. $Bi_2O_3$ has previously been fed into the lower portion of reactor 2 through hopper 3. The point of entry of the feed through line 1 is lower than the upper level of the body of $Bi_2O_3$. This is important for insuring that all the incoming acid will be contacted by $Bi_2O_3$. The $Bi_2O_3$ in reactor 2 is agitated by stirrer 4 which imparts a horizontal turbulence with some lifting action to the $Bi_2O_3$ which is present in excess. The $Bi_2O_3$ is never raised very high in reactor 2. The specific gravity of $Bi_2O_3$ is extremely high, i. e., 8.9, and this high specific gravity helps retain the $Bi_2O_3$ in the lower portion of the reactor. A colloidal suspension of the bismuth fatty acid salt is formed. The colloidal bismuth fatty acid salt aqueous suspension overflows from an upper portion of reactor 2 through line 5. By keeping the point of entry of the aqueous feed below the upper level of the $Bi_2O_3$ in reactor 2, excess unreacted feed is kept from overflowing with the mixture leaving through line 5 as all the feed contacts the $Bi_2O_3$. The temperature in this reactor can be varied but is preferably room temperature because of $Bi_2O_3$ solubility and operating economy.

Unreacted acids, colloidal bismuth fatty acid salts, and water enter another bismuth oxide reactor 6 through a point of entry lower than the upper level of a body of bismuth oxide 8 contained therein. Reactor 6 is equipped with a stirrer 9 and a hopper 10 also. Several stages of bismuth oxide reactors can be used or only one stage, depending upon the economies of the operation. The colloidal suspension of the bismuth fatty acid salts in water overflows from an upper portion of reactor 6 through line 11 to settler 12.

An electrolyte solution, i. e., sodium sulfate, is added through line 13 to line 11. The electrolyte solution serves to coagulate the bismuth fatty acid salt suspension which then settles to the bottom of settler 12 equipped with baffle 14. The settling tank effluent, if desired, can be discarded through line 15 or sent through zeolite or other ion exchange materials to recover the very small amounts of bismuth that may be dissolved therein.

A thickened slurry of bismuth fatty acid salts is withdrawn from the lower portion of settler 12 through line 16. If steam regeneration is contemplated, the water content of the slurry is then reduced as much as possible by suitable means such as, for example, by air drying and even further by filtering and centrifuging. When sulfuric acid regeneration is employed, the water content needs to be reduced only in accord with the sulfuric acid strength to be employed and the water content of the product acid desired. Conveniently, the sulfuric acid concentrations employed may vary from 80 to the commercial 97 percent. The bismuth fatty acid salt aqueous slurry is pumped to reactor 17 through line 16. Reactor 17 is equipped with a baffle 18. Sulfuric acid enters reactor 17 through line 26 and reacts with the bismuth fatty acid salts. The temperature in reactor 17 is conveniently maintained over the range from 104° C. to 163° C. The bismuth sulfate which remains as a result of the reaction in reactor 17 is withdrawn through line 19 to a filter such as a centrifugal filter 20. The fatty acids, water and sulfuric acid filtrate is pumped through line 21 to tower 22 by means of line 23. The bismuth sulfate is removed from filter 20 by means of standpipe 24. The bismuth sulfate is roasted elsewhere at elevated temperatures to regenerate the $Bi_2O_3$ which can be recycled to reactors 2 and 6.

A vaporous mixture of fatty acids and water is taken overhead from reactor 17 through line 23 and condensed in condenser 25, and sent to distillation tower 22. In distillation tower 22, the fatty acids and water are taken overhead through line 27, condensed in condenser 28 and sent to tank 29. Some of the condensed mixture is refluxed to distillation tower 22 through line 30. The remainder of the condensed mixture of fatty acid and water is withdrawn to storage through line 31. The sulfuric acid bottoms are withdrawn through line 32 and can be reutilized in the process. Acetic acid of 50 percent or higher concentration may be obtained directly from the process of this reaction. If desired, the solutions of acids obtained may be concentrated by distilling off excess water or by extraction with low or high boiling solvents or combinations of these, as is known in the art.

The equations for the reactions described above in a preferred embodiment are:

Precipitation of acid:

$$Bi_2O_3 + 2HAc \longrightarrow 2BiOAc \downarrow + H_2O$$

Regeneration with sulfuric acid:

$$2BiOAc + 3H_2SO_4 \xrightarrow{\Delta} Bi_2(SO_4)_3 + 2HAc \uparrow + 2H_2O \uparrow$$

Regeneration of oxide:

$$Bi_2(SO_4)_3 \xrightarrow{1600°F.} Bi_2O_3 + 3SO_3$$

Equations for other listed methods of regenerating the acids from the bismuth acid salts are:

Recovery with steam:

$$2BiOAc + H_2O \xrightarrow{app.\ 600°F.} Bi_2O_3 + 2HAc \downarrow$$

Recovery with sulfur trioxide:

$$2BiOAc + 3SO_3 + H_2O \xrightarrow{\Delta} Bi_2(SO_4)_3 + 2HAc \uparrow$$

Where the bismuth sulfate is roasted to recover the bismuth oxide, sulfur trioxide is also obtained. The sulfur trioxide can be reacted, with water, to yield sulfuric acid which can then be further used in the processes:

Recovery of sulfur trioxide:

$$SO_3 + H_2O \xrightarrow{H_2SO_4} H_2SO_4$$

Various electrolytes can be used to coagulate the suspension of the bismuth fatty acid salts, i. e., $Na_2SO_4$, $NaCl$, $Na_3PO_4$, etc. Sulfuric acid itself may be employed to coagulate the bismuth acid salts themselves. Concentrations of electrolytes of about 0.05% and slightly higher based on the total feed have been found ample to coagulate the bismuth acid salts.

Experimental data were obtained utilizing the process of this invention and are given below:

Example I

A 1.8% aqueous acetic acid solution was contacted with $Bi_2O_3$ as taught by this invention, for one hour at a temperature of 54° C.

The filtrate from this $Bi_2O_3$ treatment was segregated in order to ascertain the Bi losses due to solubility in dilute acid and the percentage acetic acid removed from the solution. The $Bi_2O_3$ solubility losses in the filtrate were determined by evaporating the filtrate to dryness.

The percentage acetic acid removed from the feed was 83.3% as a result of a 1-stage operation. This acetic acid recovery can be improved by a multistage operation.

It was found that the solubility of $Bi_2O_3$ was 70 parts per million in the dilute aqueous acid feed as compared to a solubility of only 5 parts per million in distilled water. This solubility data indicates that while the Bi losses are higher in an acid feed than in distilled water, these losses are negligible compared to the value of the product recovered. Example II below indicates that the bismuth losses can be virtually eliminated.

Example II

The effluent liquid such as from reactor 6 was filtered and the amount of dissolved bismuth determined by a colorimetric method. 1.0 milligram of bismuth per hundred millimeters of filtrate was obtained. After putting this filtrate through zeolite, the bismuth content was analyzed to be less than 0.1 milligram per hundred millimeters. This datum indicates how the bismuth losses can be reduced until the approximate zero.

Example III

A 2% acetic acid solution was contacted with $Bi_2O_3$ as taught by this invention. Before the $Bi_2O_3$ contacting it required 15.9 ml. of 0.2 N NaOH to neutralize 10 mm. of feed. After the $Bi_2O_3$ treatment, the resulting filtrate required only 0.1 ml. of 0.2 N NaOH for neutralization indicating that 99.4% of the total acid reacted with $Bi_2O_3$ acid could be recovered.

Example IV 271.8 gms. of BiOAc such as obtained by the process of this invention was treated with 154.9 gms. of commercial sulfuric acid and 31 gms. of water. The reaction proceeded according to the equation.

$$2BiOAc + 3H_2SO_4 \rightarrow HAc + Bi_2(SO_4)_3 + 2H_2O$$

Two types of data were obtained, the weight concentration of acetic acid in the final overhead distillate product and yield per cent of acetic acid recovered.

It was found that acetic acid concentrations as high as 85.6% weight per cent were obtained.

The actual yield of acetic acid recovered was 50.12 gms. as compared to a theoretical yield of 57.4 gms. The resulting yield or recovery of acetic acid was 87.3%.

As will be apparent from the foregoing, the present invention may be practiced with procedures other than those specifically described and under a variety of conditions of temperatures, pressures, or concentrations of materials. Such modifications are part of this invention and are intended to be included therein.

What is claimed is:

1. A process for recovering acetic acid present in a dilute aqueous solution which comprises the steps of feeding the dilute aqueous solution through a point of entry to at least one reaction zone containing a body of bismuth oxide, said point of entry being lower than the upper level of the body of bismuth oxide; forming a colloidal suspension of a bismuth salt of acetic acid; overflowing the suspension of the bismuth salt of acetic acid in water from the reaction zone; coagulating the colloidal suspension of the bismuth salt with an electrolyte and treating the thus coagulated bismuth salt with sulfuric acid to regenerate the acetic acid.

2. A process for recovering a $C_2$–$C_{12}$ fatty acid present in a dilute aqueous solution which comprises the steps of feeding the dilute aqueous solution into a point of entry to at least one reaction zone containing a body of bismuth oxide, said point of entry being lower than the upper level of bismuth oxide; forming a colloidal suspension of a bismuth salt of the fatty acid; overflowing the suspension of the bismuth salt of the fatty acid in water from the reaction zone; coagulating the colloidal suspension of the bismuth salt with an electrolyte and treating the thus coagulated bismuth salt with sulfuric acid to regenerate the fatty acid.

3. A process as in claim 2 in which the fatty acid is a lower fatty acid.

4. A process for recovering a mixture of fatty acids present in a dilute aqueous solution which comprises the steps of feeding the dilute aqueous solution into a point of entry to at least one reaction zone containing a body of bismuth oxide, said point of entry being lower than the upper level of the body of bismuth oxide; forming a colloidal suspension of bismuth salts of the fatty acids; overflowing the suspension of the bismuth fatty acid salts in water from the reaction zone; coagulating the colloidal suspension of the bismuth salts with an electrolyte and treating the bismuth fatty acid salts to regenerate the fatty acids.

CHAUNCEY C. HALE.

REFERENCES CITED

The following references are of record in the file of this patent:

Cuny: Chem. Zeutr., I, page 2188 (1927).

Kharmandaryan: C. A., vol. 23, page 2117 (1929).